United States Patent Office 3,532,884
Patented Oct. 6, 1970

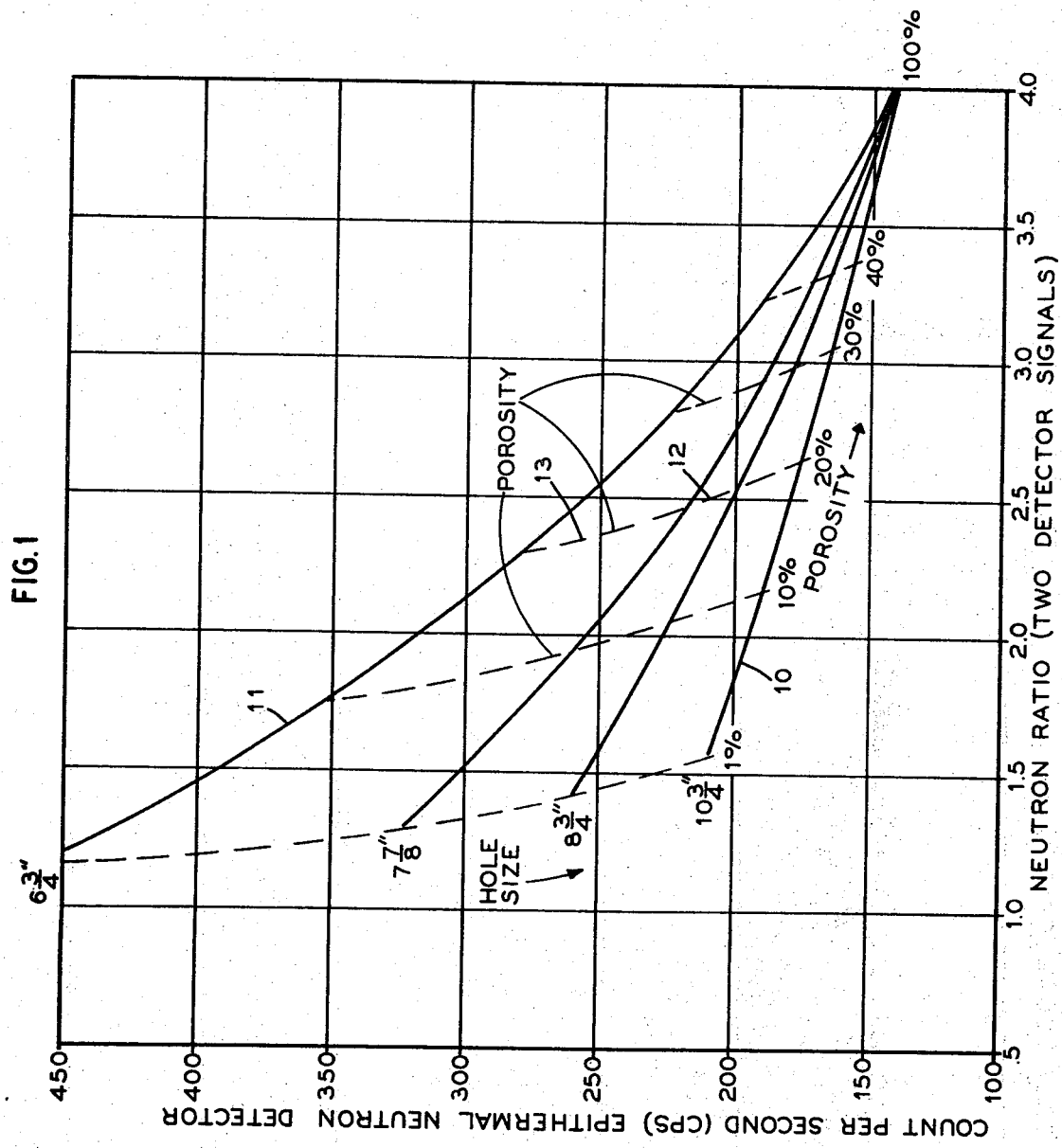

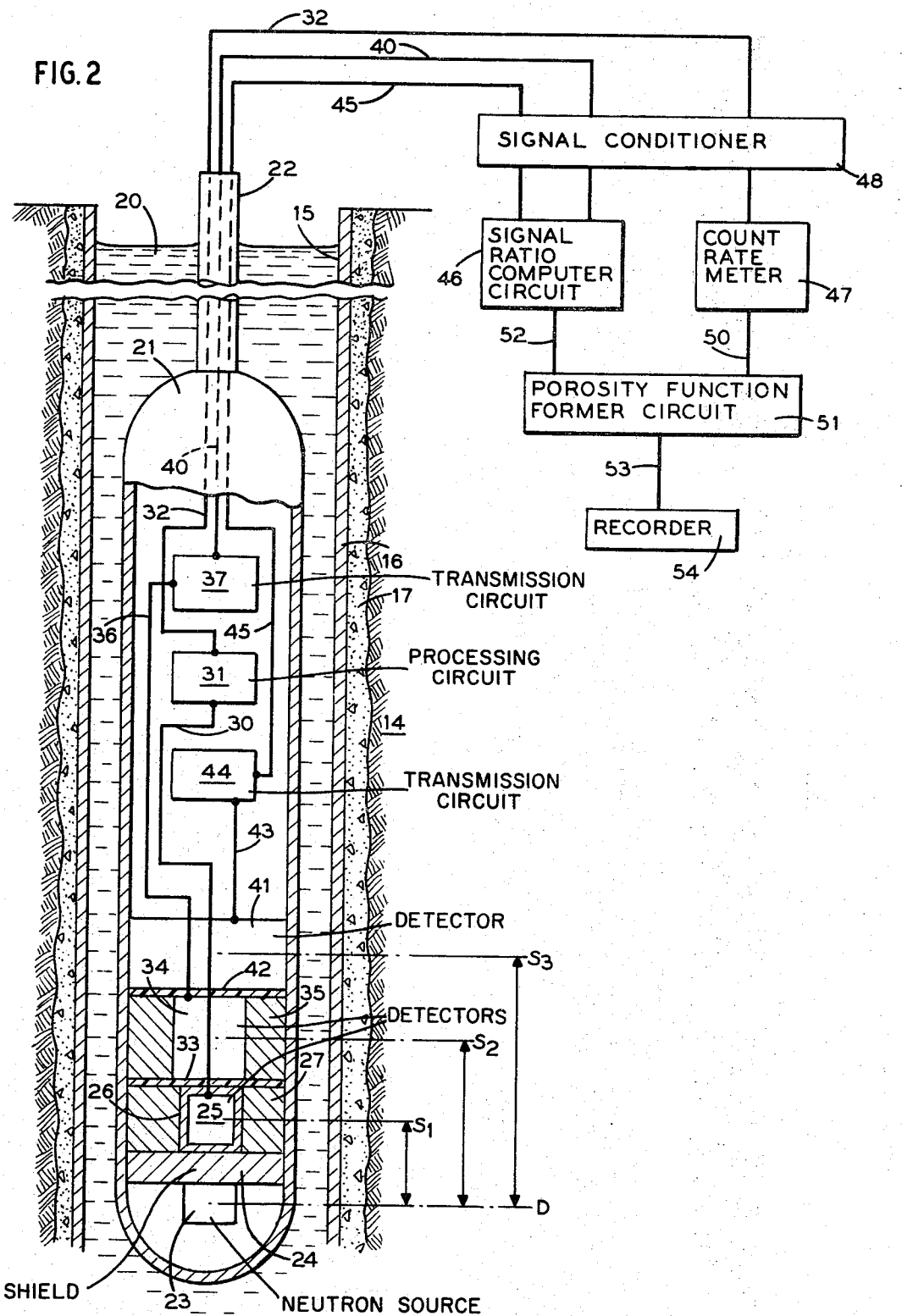

3,532,884
**MULTIPLE DETECTOR NEUTRON
LOGGING TECHNIQUE**
John T. Dewan, Houston, Tex., assignor to Schlumberger
Technology Corporation, New York, N.Y., a corporation of Texas
Filed Oct. 27, 1967, Ser. No. 678,701
Int. Cl. G01t 3/00
U.S. Cl. 250—83.1                                   2 Claims

ABSTRACT OF THE DISCLOSURE

An illustrative embodiment of the invention corrects inaccuracies in the responses from a two-neutron detector porosity logging tool caused by changes in the borehole environment. The two signal-producing neutron detectors are spaced at different distances from the neutron source. These detector signals are combined to establish a ratio signal that is related to the apparent formation porosity. An epithermal neutron detector, however, is spaced more closely to the source than either of the porosity detectors in order to produce a corrective signal that compensates the ratio signal for the effect of changes in the borehole characteristics.

BACKGROUND OF THE INVENTION

Field of the invention

This invention relates to borehole logging techniques, and more particularly, to an improved radioactivity tool for measuring the porosity of an earth formation by observing the diffusion of neutrons through the formation and the borehole, and the like.

Description of the prior art

Because earth formation porosity often is needed to determine potential oil production, techniques for accurately measuring this parameter are of substantial industrial importance.

Typical of the proposals that have been advanced to measure these porosities is a tool that contains a neutron source for transport through the borehole. The neutrons emitted from the source diffuse through the surrounding formations and establish a spatial distribution that is determined, to a large extent, by the porosity of the earth structure.

Depending on the nature of the source, the emitted neutrons have initial energies from an average value of about 2 million electron volts (mev.) up to 14.1 mev. These irradiating neutrons usually lose energy through collisions with nuclei in the materials that comprise the borehole environment and the earth formation. The lower atomic number nuclei (hydrogen, for example) absorb much more energy from each colliding neutron than higher atomic number elements, such as calcium. After successive collisions, the average kinetic energy of the neutrons is reduced or degraded to thermal equilibrium with the medium through which they are diffusing, a value that usually is taken to be about .025 electron volt (ev.).

Hydrogen is a major constituent of the cement annulus and the fluids usually found in boreholes. The superior neutron thermalizing capabilities of hydrogen relative to other formation materials often causes the signal from a thermal neutron sensitive detector in the logging tool to reflect casing and borehole conditions as well as the formation porosity. Consequently, those proposed tools that respond to thermal neutrons or a thermal neutron effect, as for example, capture gamma radiation, generally establish a signal that characterizes both the formation and the borehole. Thus, as the cement thickness or some other borehole environment condition varies, a change is observed in the detector response or count rate. In the absence of additional information, however, it is not possible to ascribe this observed change to a differing formation porosity, or to a variation in some of the borehole parameters. Accordingly, the signals from logging tools of this type often are ambiguous and diffifficult to interpret.

Neutrons that have not transferred sufficient energy through collisions with nuclei to reach kinetic equilibrium with the formation constituents are called epithermal neutrons. Because these higher energy neutrons are not readily absorbed by the chlorine in the often brackish borehole fluids, the epithermal neutron distribution often presents a more balanced indication of the borehole environment than the thermal neutron distribution which is sensitive to the thermalizing influence of the cement as well as neutron absorbing nuclei.

Clearly, there is a need for a technique that adjusts the signals from a neutron logging tool for the effects caused by changes in the borehole conditions.

Consequently, it is an object of the invention to provide an improved neutron tool that compensates the apparent formation porosity for borehole effects.

It is still a further object of the invention to combine the epithermal neutron distribution with the observed thermal and epithermal neutron distribution to provide an improved measurement of earth formation porosity.

SUMMARY

In accordance with the invention, an epithermal neutron detector is positioned within a neutron porosity logging tool to produce an accurate response to the borehole environment. The epithermal detector signal is then combined with a neutron porosity signal to correct the porosity signal for borehole conditions.

More specifically, a typical porosity logging tool embodying the invention has a pair of neutron detectors that respond to thermal neutrons. These detectors are spaced at different distances form a source of neutrons within the tool housing. Illustratively, the porosity detectors are separated from the active center of the neutron source by distances of 17.5" and 24.7", respectively.

The signals from both of these detectors are combined to establish a ratio of detector counts that ordinarily is related to the porosity of the formation under investigation. A typical device of this sort is described in more complete detail in U.S. patent application Ser. No. 570,068 filed Aug. 3, 1966 by Stanley Locke, Harold Sherman and John S. Wahl for "Measuring Apparatus and Method," and assigned to the same assignee as the invention described herein.

The epithermal neutron detector is spaced about 4" from the neutron source in a position that is between the suorce and the shortest-spaced of the two porosity detectors. Both the epithermal response and the short spacing of this detector are chosen to maximize the response of the detector to borehole variations and minimize its response to formation porosity.

Appropriate downhole signal transmission circuits are provided within the logging tool to transmit the three detector signals to an automatic calculator on the earth's surface. The calculator establishes the ratio between the two far-spaced detectors and combines with this ratio, according to a predetermined relationship, the epithermal neutron detector signal. This combination produces an output signal that is more nearly related to the true porosity of the earth formation than those tools that have characterized the prior art.

For a better understanding of the present invention, together with other and further objects thereof, reference is had to the following description taken in connection

BRIEF DESCRIPTION OF THE DRAWING

FIG. 1 is a graph showing an exemplary combination of the epithermal neutron detector signal and the signal ratios from the two thermal detectors in accordance with the invention; and FIG. 2 is a schematic diagram of an illustrative embodiment of a borehole tool, also in accordance with the invention, in which the electrical circuits associated therewith are shown in block diagram form.

DESCRIPTION OF THE PREFERRED EMBODIMENTS

For a better appreciation of the invention, FIG. 1 shows a graph that combines a ratio derived from the signals produced by two thermal neutron detectors spaced at different distances from a neutron source, with the signal from an epithermal neutron detector spaced a different distance from the neutron source than either of the other two detectors. The formation from which the porosity data presented in FIG. 1 was compiled was traversed by boreholes with diameters that varied from 10¾" (curve 10) down to 6¾" (curve 11). The data for the graph in FIG. 1, moreover, was drawn from formations of identical mineral composition, as for example, limestone. Other mineral structures, such as sandstone or dolomite, require different graphs prepared from data taken in the same manner as that which is described in connection with FIG. 1.

Illustratively, if the ratio derived from the far-spaced detectors is 2.5 and the epithermal neutron detector count rate is 210 counts per second (CPS), a point 12 is identified on a line of constant porosity 13. The point 12 on the line 13 indicates that the porosity of the formation under investigation is 20 percent.

It appears from an examination of FIG. 1 that the signals from the thermal neutron detectors more clearly distinguish the neutron distribution within the formation, if combined with an epithermal neutron detector signal, than techniques that rely on the thermal detector signals alone. Thus, the actual formation porosity may be any combination of porosities and borehole sizes that intersect the vertical ordinate characterizing the 2.5 signal ratio. The additional information provided by the epithermal neutron detector signal in accordance with the invention, however, readily identifies the specific borehole size and formation porosity under observation to a reasonable degree of accuracy.

An exemplary tool for practicing the invention is shown in FIG. 2. An earth formation 14 is traversed by a borehole 15. The borehole 15 may be open, or it may be cased with one or more strings of steel pipe 16 and annuli of cement 17. The borehole may be dry (not shown) or filled with a fluid 20.

The borehole logging tool comprises a pressure resistant steel housing 21. The pressure housing 21 is lowered into and withdrawn from the borehole 15 by a multiconductor armored cable 22 and winch (not shown). A neutron source 23 is positioned in the lowermost portion of the housing 21. The source 23 abuts a shield 24 that is formed preferably of a mixture of graphite or polyethylene and sufficient boron to capture the neutrons thermalized within the shield 24, or the like. The neutron source 23 preferably is an intimate mixture of plutonium or americium and beryllium that emits neutrons continuously as a result of nuclear reactions initiated by the two constituent materials. Typically, a source activity of 5 curies is adequate for the purpose of irradiating a borehole 15, steel pipe 16, cement 17 and formation 14 with neutrons in accordance with the invention.

Neutrons (not shown) emitted from the source 23 pass through the housing 21, the fluid 20, the steel pipe 16 and the cement 17 to diffuse through the earth formation 14. The neutron population distribution thus established in the formation 14 depends, to a great extent, on the formation porosity.

Some of these diffusing neutrons are scattered back to the logging tool as a result of one or more collisions with the nuclei that comprise the formation materials. A neutron detector 25 is spaced vertically above the source 23 and shield 24 by about 4 to 8 inches. Although the detector spacing as shown is measured from the active center of the neutron source (D) to the effective center of the detector 25 ($S_1$), other separation measurement reference points associated with the detector and the neutron source can be chosen. For example, the geometric center or some other common physical point is a suitable reference.

Typically, the neutron detector 25 is a helium-3 ($He^3$) gas-filled tube about 3" long and 1¾" in diameter in which the outer cylindrical enclosure serves as a cathode (not shown) and insulated therefrom, is an anode wire that enables an electrical field to be established between the anode and cathode. Neutrons scattered back from the formation 14 are absorbed by the $He^3$ nuclei. This neutron absorption causes the absorbing nuclei to split up into electrically charged particles. These particles ionize the tube gas and establish charge pulses in the detector electrodes, in which each pulse indicates a detected neutron or "count." Alternatively, other neutron detectors are suitable for this application; for example, boron trifluoride ($BF^3$) counters also are satisfactory.

Encasing the detector 25 is a thin sheath 26 of metallic cadmium approximately .02" thick. The cadmium sheath 26 has an extremely high capture cross section for thermal neutrons and thus absorbs substantially all the thermal neutrons incident upon the detector 25. Thus, the sheath 26 prevents these neutrons from entering the active volume of the detector 25 and initiating the counting response described above.

The detector 25 and the cadmium sheath 26 are centrally disposed within the housing 21 by an aluminum centralizer 27. Signals from the neutron detector 25 characterizing the epithermal neutron population in its vicinity are sent through a conductor 30 to the earth's surface through a path that includes a downhole signal processing circuit 31 and a conductor 32 in the armored cable 22.

Separated from the detector 25 by a shock-absorbing gasket 33 of neoprene or the like, is a second neutron detector 34, centralized within the housing 21 by an annular aluminum space 35. The distance between the effective center ($S_2$) of the detector 34 and the active center (D) of the neutron source 23 in the exemplary embodiment of the invention shown in FIG. 2 is 17.5". Unlike the neutron detector 25, the detector 34 does not have a cadmium sheath. Consequently, the detector 34 responds to thermal and epithermal neutrons. The detector 34 typically is an $He^3$ filled device of the sort described in connection with the detector 25 and has a length of 7¼" and a diameter of 1¾".

Signals corresponding to thermal and epithermal neutron counts are sent from the detector 34 through a conductor 36 to a downhole signal transmission circuit 37. Similar to the circuit 31, the circuit 37 includes pulse height discriminators to eliminate noise; scaling circuits to reduce the transmission burden on the cable 22; and signal amplifiers in order to condition the signal from the detector 34 for transmission to the earth's surface through a conductor 40 in the armored cable.

A thermal and epithermal neutron detector 41, of the same sort as that which is shown in connection with the detector 34, is spaced vertically above the detector 34 by a gasket 42 of neoprene or the like. The neutron detector 41 is substantially coextensive with the internal dimensions of the pressure housing 21 in order to provide the maximum neutron sensitivity attainable within the dimensions of a logging tool of reasonable size.

Maximum neutron sensitivity is required of the detector 41 because the neutron population declines in a logarithmic manner with separation from the source 23. Thus, the most distantly spaced detector 41 of the two long-spaced porosity logging detectors 34 and 41 must be as sensitive as possible in order to register a statistically adequate accumulation of neutron counts. The unsheathed detector 41 preferably has a length of 9¼" and a diameter of 2¾". Illustratively, the effective center ($S_3$) of the detector 41 is separated from the active center (D) of the neutron source 23 by a distance of about 24⁷⁄₁₀".

Charge pulses that register the neutrons incident on the detector 41 are sent through a conductor 43 to a downhole signal transmission circuit 44 of the same character as those that were described in connection with the circuits 31 and 37. The circuit 44 sends a signal through a conductor 45 in the armored cable 22 to the earth's surface.

On the earth's surface a signal conditioner 48 responds to the individual signals in the conductors 32, 40 and 45 from the neutron detectors 25, 34 and 41, respectively. The conditioner 48 discriminates against noise, amplifies, and scales the received signals to aid in subsequent processing.

As described in more complete detail in the aforementioned Locke et al. patent application, the signals from the two far-spaced detectors 34 and 41 are applied by the conditioner circuit 48 to a signal ratio computer circuit 46 to produce an output signal on a conductor 52 that corresponds to the ratio of the signal from the detector 34 to the signal from the detector 41.

The signal from the epithermal neutron detector 25 is applied by the conditioner circuit 48 to a count rate meter 47. The count rate meter establishes a signal in a conductor 50 that corresponds to the observed epithermal neutron detector counts as a function of time.

A porosity function former circuit 51 responds to the ratio signal in the conductor 52 and the epithermal count rate signal in the conductor 50 to produce an output signal in a conductor 53 that corresponds to the porosity of the formation 14. The function former circuit 51 preferably comprises an array of operational amplifiers with diode-resistance feedback networks. The feedback circuits established amplifier output response that correspond to the individual curves on the graph shown in FIG. 1. Separate function former circuits (not shown) are provided for manual connection to the conductors 50, 52 and 53 in order to accommodate differences in thermal and epithermal neutron relations caused by changes in the mineral composition of the earth formation. Thus, if the earth formation 14 is limestone, a response similar to that shown in FIG. 1 is established by the porosity function former circuit 51. As the housing 21 is drawn upward through the borehole 15 and traverses a different mineral formation, the function former must be changed accordingly in order to produce the correct porosity signal in response to the input detector signals. Prior knowledge of the mineral composition at different borehole depths for the purpose of selecting the appropriate function former circuit is acquired, for example, through an examination of drill cuttings, or the like.

The data required to establish graphs of the type shown in FIG. 1 for different mineral compositions from which function former circuit values can be derived are accumulated, it will be recalled, by logging earth formations of known compositions and porosites.

The output signal from the porosity function former circuit 51 is applied through the conductor 53 to a recorder 54 that produces a graph of formation porosity as a function of borehole depth.

Depending on the character of the borehole environment, the logging tool may be drawn freely through the borehole as shown; centralized in the borehole by means of bowsprings or the like; or urged against one side of the borehole with the aid of a backup pad. If the housing 21 is urged against the borehole wall, the neutron source 23 and detector 34 also ought to be positioned off-center within the housing 21 and adjacent to the portion of the housing that is tangent to the borehole wall.

As another alternative, a tool comprising only the two porosity detectors 34 and 41 can be run through the borehole 15 as described in more complete detail in the aforementioned Locke et al. patent application. The signals from these detectors in this circumstance are stored on tape or punched cards and the like. The epithermal neutron detector signal is acquired through a separate logging run performed with a tool generally of the type described in U.S. patent application Ser. No. 588,400, filed Oct. 21, 1966 for "Improvement in Epithermal Neutron Logging" by Harold Sherman and Jay Tittman and assigned to the same assignee as the invention described herein. The epithermal neutron detector signal also is stored on tape or punched cards for subsequent combination in a manner hereinbefore described in connection with FIG. 2.

A further embodiment of the invention, moreover, contemplates positioning the epithermal neutron detector 25 either between the detectors 34 and 41, or beyond the detector 41.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A system for logging boreholes comprising a tool for traversing the borehole, a neutron source within said tool, an epithermal neutron detector within said tool for producing a signal that corresponds to the epithermal neutron population established by said source in the vicinity of said tool, a plurality of neutron detectors spaced at different distances from said source for producing at least two signals that correspond to the thermal neutron population established in the vicinity of said tool by said neutron source, circuit means within the tool for transmitting said neutron detector signals through the borehole to the earth's surface, further circuit means responsive to said thermal neutron population signals for establishing another signal that is related to the ratio of said thermal neutron signals, and earth formation circuit means coupled to said ratio signal and said epithermal neutron signal to produce an output that corresponds to a characteristic of the earth formation traversed by the borehole in accordance with a predetermined relation and a rate circuit responsive to said epithermal neutron signal to produce still another signal that corresponds to the epithermal neutron population as a function of time, and means for coupling said epithermal neutron time signal to said earth formation circuit means.

2. A technique for measuring the porosity of an earth formation traversed by a borehole comprising a housing for transport through the borehole, a neutron source, an epithermal neutron detector spaced from said source on the order of about four inches to produce a signal that corresponds to the epithermal neutron population in the vicinity thereof, a neutron detector within said housing and sensitive to the thermal and epithermal neutrons backscattered from the formation and spaced from said source on the order of about 18 inches to produce a signal in response to said neutrons, a neutron detector within said housing and more sensitive than either of said detectors to the thermal and epithermal neutrons backscattered from the formation and spaced from said source on the order of about 25 inches to produce a signal in response to said neutrons, circuit means within said housing for transmitting said signals to the earth's surface, a count rate meter responsive to said epithermal neutron detector signals for producing an output signal that corresponds to the epithermal neutron population as a function of time, a signal ratio computer circuit responsive to said thermal neutron signals to establish an output signal that is related to the ratio of said two detector signals, and further circuit means responsive to said ratio signal and said count rate signal for producing an indication of the porosity of the earth formation in accordance with a predetermined relation.

References Cited

UNITED STATES PATENTS 3,219,820 11/1965 Hall _____ 250—83.6 X
3,413,466 11/1968 Allen _____ 250—71.5

RALPH G. NILSON, Primary Examiner

D. L. WILLIS, Assistant Examiner

U.S. Cl. X.R.

250—83.3, 83.6